Nov. 23, 1937.  E. G. HILL ET AL  2,100,053
BRAKE CONTROL MECHANISM
Filed Jan. 31, 1934
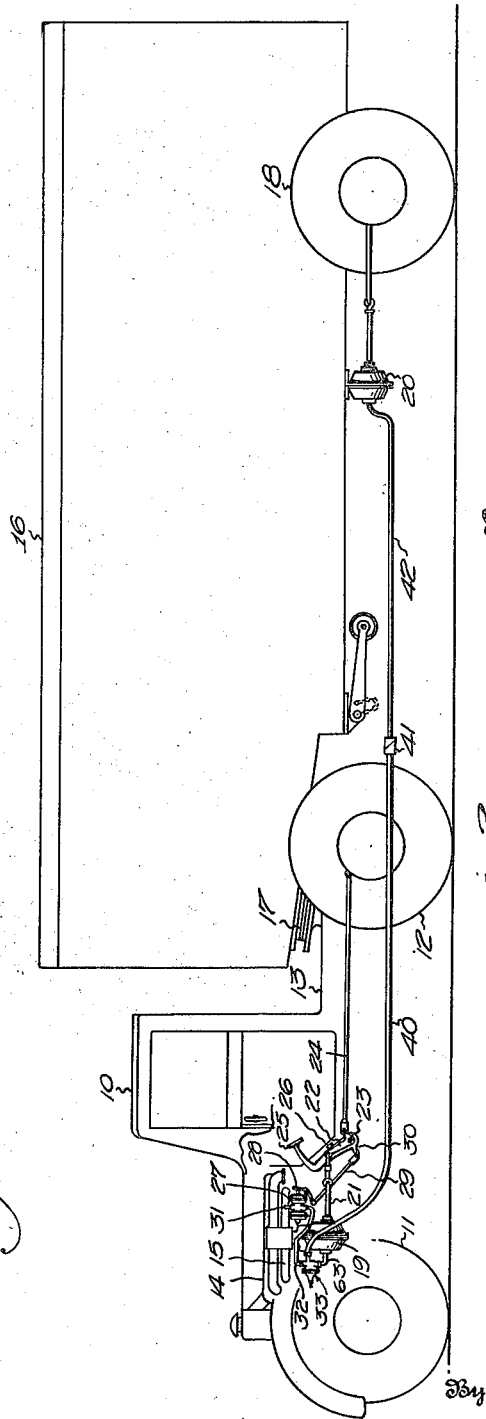
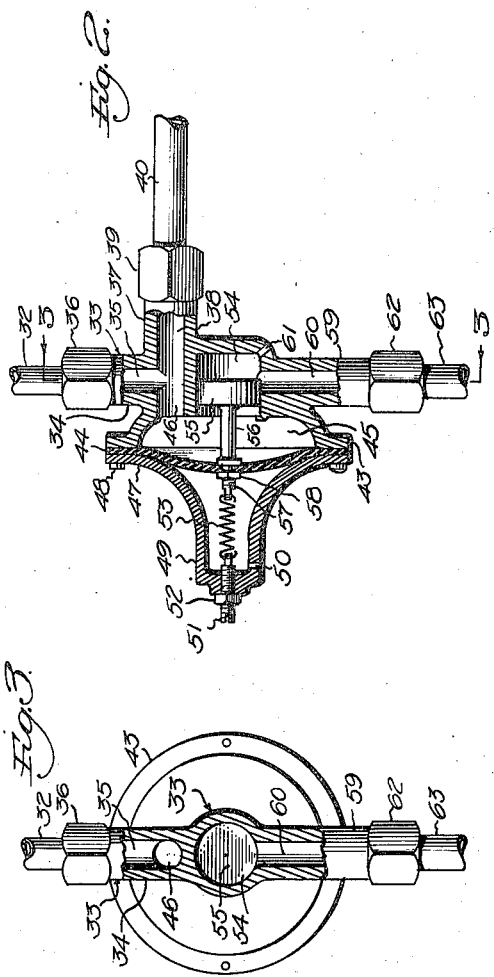
Inventor
EDWARD G. HILL
JOHN X. PHILLIPS
By C. L. Parker Jr.
Attorney Patented Nov. 23, 1937

2,100,053

UNITED STATES PATENT OFFICE 2,100,053

BRAKE CONTROL MECHANISM

Edward G. Hill, Richmond, Va., and John X. Phillips, Washington, D. C., assignors to Hill Engineering Corporation, Richmond, Va., a corporation of Virginia Application January 31, 1934, Serial No. 709,204

12 Claims. (Cl. 188—3)

This invention relates to brake control mechanisms for motor vehicles and more particularly to control means for the fluid pressure brakes of truck and trailer combinations.

The use of combined truck and trailer arrangements has been increasing for several years, particularly in connection with large delivery and transportation vans, buses, etc. For example, it is the increasing practice of department stores to utilize such an arrangement in view of the economy effected through the use of a smaller number of trucks. While a truck is making deliveries with a trailer van connected thereto, one of the trailers may be loaded ready for the next delivery, thus eliminating the necessity of tying up the truck during the substantial period necessary for the loading of the van.

The great weight involved in the use of truck and trailer combinations has made it advisable to utilize power brakes in connection with such constructions, such as brakes operated by differential pressure. Brakes of the latter type are sometimes operated with compressed air as the source of power, although vacuum operated brakes are becoming increasingly popular for the reason that the source of differential pressure is always present in the intake manifold of the truck engine.

Trailers of the type referred to are sometimes of the four wheel type with couplings at the forward ends to adapt them for connection with the rear end of a truck, but it is becoming the increasing practice to provide such trailers with only two wheels arranged adjacent the rear end thereof together with means for supporting the forward end of the trailer on the rear end of the truck and coupling the two vehicles together through the supporting means. Where fluid pressure brakes are used in truck and trailer combinations, the power devices for operating the brakes of the two vehicles are subject to control through a suitable valve mechanism operating to connect the power devices to the source of differential pressure. Obviously, the power device associated with the trailer brakes is located a substantially greater distance from the control valves than the power device of the truck brakes, and it has been found that the control valve operates to effect the braking of the truck prior to the braking of the trailer. This operation is highly disadvantageous and sometimes results in what is known as "jack knifing", due to the running up of the trailer upon the truck.

It has been proposed to overcome this difficulty by employing two wholly separate and distinct control valves for the power devices of the truck and trailer brakes, and to design the control valve mechanisms or adjust them in such a manner as to cause the trailer brakes to be applied prior to the truck brakes. In such case, the operation of each set of brakes is wholly dependent upon its respective control valve mechanism and misadjustment or derangement of parts can destroy the relationship between the valve mechanisms to prevent their proper operation. Moreover, the use of two complete control valve mechanisms is relatively expensive.

An important object of the present invention is to provide an extremely simple type of control device operative for positively effecting the actuation of one set of vehicle brakes prior to the actuation of another set of vehicle brakes.

A further object is to provide an auxiliary control valve associated with a single main control valve to cause the actuation of the brakes of a trailer to take place definitely though slightly ahead of the actuation of the brakes of the truck to which the trailer is connected.

A further object is to utilize the power through which brake actuation is effected for causing positive actuation of the brakes of a trailer prior to the actuation of the brakes of the truck to which the trailer is connected.

A further object is to provide a differential pressure operated auxiliary control valve for differential pressure operated vehicle brakes, operative in conjunction with a single main control valve and arranged between such valve and the brake actuators of a truck and trailer combination for causing actuation of the trailer brakes to take place ahead of the vehicle brakes.

A further object is to provide an auxiliary control valve of the character referred to which provides a normally open fluid pressure line between the main control valve and the actuator for the trailer brakes, and a normally closed fluid pressure line leading to the truck brake actuator, and to provide means for automatically opening the latter line upon the generation in the line to the trailer brake actuator of a predetermined differential pressure tending to operate the trailer brakes, whereby the latter brakes are caused to be initially applied prior to the initial application of the truck brakes.

Other objects and advantages of the invention will become apparent during the course of the following description.

In the drawing we have shown one embodiment of the invention. In this showing,

Figure 1 is a side elevation of a truck and trailer illustrated somewhat diagrammatically and showing the invention applied thereto.

Figure 2 is a central vertical longitudinal sectional view through the auxiliary control valve, and, Figure 3 is a section on line 3—3 of Figure 2.

Referring to Figure 1, the numeral 10 designates a truck supported on forward and rear wheels 11 and 12 respectively, the chassis of the truck being generally illustrated by the numeral 13. The truck is provided with the usual engine 14 having an intake manifold 15 constituting the source of differential pressure for operating the vehicle brakes in accordance with the present disclosure. A trailer of the two wheel type is designated by the numeral 16 and has its forward end supported upon the rear end of the chassis 13 and connected thereto by means of a suitable coupling 17. The trailer is supported upon rear wheels 18.

The truck and trailer are respectively provided with power devices 19 and 20 operative by differential pressure and shown in the present instance as being operative by the partial vacuum present in the intake manifold 15. The power device 19 actuates a movable member 21 connected to a brake actuating lever 22 mounted on a shaft 23 forming a part of the conventional vehicle brake mechanism. Operation of the lever 22 exerts a pull on a conventional brake pull rod 24 to apply the vehicle brakes (not shown). The vehicle brake pedal 25 is also mounted on the shaft 23 and is provided with a lug 26 engageable with the lever 22 to actuate the latter to apply the brakes in the event of the failure of the power brake applying means.

Any suitable form of main control valve mechanism may be employed, and such a mechanism has been illustrated in Figure 1 and designated by the numeral 27. A suitable form of main control valve is described and claimed in the copending application of Edward G. Hill, Serial No. 668,656, filed April 29, 1933. While such a valve mechanism is particularly advantageous in use for the reason that it provides an accurate progressive brake application together with other advantages, it will be apparent that the use of such specific type of control valve mechanism is not essential to the operation of the present device. The control valve mechanism 27 is operative through a bell crank lever 28 adapted to be actuated by a link 29 connected to a crank 30, this crank being rigidly connected to the brake pedal 25. It will be apparent that a slight lost motion exists between the lug 26 and crank arm 22 so that initial actuation of the pedal 25 actuates the valve mechanism 27 to apply the brakes in a manner to be described.

The valve mechanism 27 is connected to the intake manifold as at 31 and the operation of the control valve mechanism connects the intake manifold to a vacuum pipe 32 leading to an auxiliary control valve indicated as a whole by the numeral 33 and illustrated in detail in Figures 2 and 3. The valve 33 has an integral body including a vertical portion 34 having a vertical conduit 35 extending therethrough, and the vertical portion 34 is connected to the pipe 32 by a suitable union 36. A horizontal extension 37 is carried by the auxiliary valve body and is provided with a passage 38 communicating with the passage 35. A union 39 connects the valve extension 37 to one end of a pipe 40 leading rearwardly as indicated in Figure 1. The pipe 40 is coupled at its rear end in any suitable manner as at 41 to a pipe 42 leading to the power device 20. It will be apparent that the pipe 32, passages 35 and 38, and pipes 40 and 42 constitute an unbroken vacuum connection between the main control valve 27 and the brake actuating device 20 of the trailer.

Forwardly of the extension 34, the valve body 33 is provided with an enlarged annular flange 43 against which a diaphragm 44 is seated, and the flange 43 and diaphragm 44 form a diaphragm chamber 45. This chamber is in fixed communication with the passage 35 through the end 46 of the passage 38. Accordingly it will be apparent that the chamber 45 is influenced by the pressure present in the passage 35.

A cap 47 is arranged against the diaphragm 44 and is secured to the outer edge portion of the flange 43 by suitable screws 48. This cap is provided with an axial extension 49 having a vent opening 50 in one side thereof. A screw 51 is threaded in the outer end of the extension 49 and is secured in adjusted position by a lock nut 52. A spring 53 is connected at one end to the screw 51, as shown in Figure 2. A cylinder 54 is formed in the valve body 33 and receives a piston 55 reciprocable therein. An integral stem 56 is carried by the piston 55 and has a reduced end extending through the diaphragm 44 and threaded as at 57. A nut 58 is threaded on the stem portion 57 and engages against the diaphragm 44. The inner end of the spring 53 is connected to the extremity of the stem portion 57.

Beneath the extension 34, the valve body 33 is further provided with an extension 59 having a passage 60 therethrough communicating with the cylinder 54. The piston 55 is normally arranged to one side of the end of the passage 60, as shown in Figure 2, to close communication between the passage 60 and chamber 45, and the inner end of the cylinder 54 communicates with the atmosphere through a port 61 whereby atmospheric pressure is normally present in the passage 60. The extension 59 is connected by a union 62 to one end of a pipe line 63 leading to the power device 19 of the truck brakes, as shown in Figure 1.

The operation of the device is as follows:

The brakes are applied by the progressive depression of the pedal 25, such movement being transmitted to the valve mechanism 27 through the levers 28 and 30 and link 29. The operation of the valve mechanism 27 affords communication between the intake manifold and the pipe 32, and this pipe is in constant communication with the power device 20 of the trailer. A reduction in pressure in the pipe 32 accordingly is immediately communicated to the power device 20 to initiate application of the trailer brakes. The pipe 32 is normally out of communication with the pipe 63, however, due to the position of the piston 55 and accordingly the initial operation of the trailer brakes takes place before there is any actuation of the truck brakes. In the case of vacuum brakes of the type disclosed, the reduction in pressure in the passage 35 upon the operation of the valve mechanism 27 is communicated to the chamber 45, and since the outer face of the diaphragm 44 is influenced by atmospheric pressure, a pressure differential accordingly will be created on opposite sides of the diaphragm 44 to move the valve 55 inwardly.

Upon the building up of a predetermined differential pressure on opposite sides of the diaphragm 44, the piston 55 will be moved past the upper end of the passage 60, thus closing communication through the atmospheric port 61 and opening communication to the diaphragm chamber 45. Since this chamber communicates with the passage 35, it will be apparent that the movement of the piston valve 55 in the manner referred to connects the power device 19 to the intake manifold through the valve mechanism 27 to apply the brakes of the truck.

As previously stated, it is preferred that the valve mechanism 27 be of the type disclosed in the application of Edward G. Hill, Serial No. 668,656, in which case the application of the brakes takes place proportionate to the degree of movement of the pedal 25, and the releasing of the brakes takes place proportionate to the degree to which the brake pedal 25 is released. The spring 53 is relatively weak and no substantial reduction in pressure in the chamber 45 is necessary to move the piston valve 55, and accordingly the proper operation of the valve 27 is not noticeably disturbed by the resistance to the movement of the piston valve 55.

From the foregoing it will be apparent that the power device 20 will be subjected to differential pressure prior to the actuation of the power device 19, and this operation is bound to occur regardless of the length of the piping connections between the valve 33 and the power device 20. It obviously will be apparent that regardless of the length of such piping connections a reduction in pressure throughout the entire line between the main valve 27 and the power device 20 must occur before the piston valve will move to open position, and this fact insures the operation of the power device 20 to apply the trailer brakes prior to the application of the truck brakes. Upon the releasing of the brake pedal 25, the passages 35 and 46 and chamber 45 will be communicated to the atmosphere and the diaphragm 44 will return to normal position. The passage 60 will then communicate with the atmosphere through the port 61. In this connection attention is invited to the fact that the pressure differential necessary for holding the piston valve 55 in operative position is relatively slight, and accordingly such valve will remain in its operative position during the progressive releasing of the brakes until both sets of brakes are nearly fully released before the diaphragm 44 will return to normal position.

With the present device, it will be apparent that the valve 33 is much simpler than the main control valve and is cheaper to manufacture, and the entire apparatus thus costs less to manufacture than an apparatus which employs two independent main control valve mechanisms. Moreover, it will be apparent that the single adjustment employed in the auxiliary valve is quite simple, and the adjustment is not critical. The spring 53 is relatively weak and merely operates to hold the valve 55 in the position shown in Figure 2 until air has been exhausted to a predetermined extent in the trailer brake line before the diaphragm 44 will act to open the suction line to the truck brake. Thus it will be apparent that the device is extremely simple and positive in operation. While the invention has been specifically described in connection with vacuum operated brakes, it will be apparent that it is equally adapted for use in connection with any form of differential fluid pressure operated brakes.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. In a braking system for a truck and trailer combination, a power device for operating the truck brakes, a power device for operating the trailer brakes, a manually operable control mechanism for connecting the power devices to a source of power, and automatic means dependent solely on the differential pressure acting on said trailer power device for rendering said control mechanism operative for connecting the truck brake power device to the source of power.

2. In a differential pressure operated braking system for a truck and trailer combination, a differential pressure power device for operating the truck brakes, a differential pressure power device for operating the trailer brakes, a manually operable control valve mechanism for connecting the power devices to a source of differential pressure, and automatic means dependent solely on the differential pressure acting on the trailer brake power device for rendering said control valve mechanism operative for connecting the truck brake power device to the source of differential pressure.

3. In a differential pressure operated braking system for a truck and trailer combination, a differential pressure power device for operating the truck brakes, a differential pressure power device for operating the trailer brakes, a manually operable control valve mechanism for connecting the power devices to a source of differential pressure, a normally closed valve between said control valve mechanism and the truck brake power device, and means for opening said valve dependent solely on the differential pressure acting on said trailer brake power device.

4. In a differential pressure operated braking system for a truck and trailer combination, a differential pressure power device for operating the truck brakes, a differential pressure power device for operating the trailer brakes, a manually operable control valve mechanism connected to a source of differential pressure, a pressure line for connecting said control valve mechanism to the trailer brake power device, a second pressure line for connecting said control valve mechanism to the truck brake power device, a valve normally closing said second named pressure line, and means for opening said valve dependent solely on the differential pressure acting on said trailer power device through said first named pressure line.

5. In a differential pressure operated braking system for a truck and trailer combination, a differential pressure power device for operating the truck brakes, a differential pressure power device for operating the trailer brakes, a manually operable control valve mechanism connected to a source of differential pressure, a pressure line for connecting said control valve mechanism to the trailer brake power device, a second pressure line for connecting said control valve mechanism to the truck brake power device, a valve normally closing said second named pressure line, a chamber communicating with said first named pressure line to be influenced by pressure therein, and a pressure responsive member in said chamber connected to said valve to move it to open position, the actuation of said pressure responsive member being dependent solely on the differential pressure acting on the trailer power device through said first named pressure line.

6. In a differential pressure operated braking system for a truck and trailer combination, a differential pressure power device for operating the truck brakes, a differential pressure power device for operating the trailer brakes, a manually operable control valve mechanism connected to a source of differential pressure, a pressure line for connecting said control valve mechanism to the trailer brake power device, a second pressure line between said first named pressure line and the truck brake power device, a valve normally closing said second pressure line, and means for opening said valve dependent solely upon the differential pressure acting on said trailer power device through said first named pressure line.

7. In a differential pressure operated braking system for a truck and trailer combination, a differential pressure power device for operating the truck brakes, a differential pressure power device for operating the trailer brakes, a manually operable control valve mechanism connected to a source of differential pressure, a pressure line for connecting said control valve mechanism to the trailer brake power device, a second pressure line between said first named pressure line and the truck brake power device, a valve normally closing said second pressure line, said second pressure line including a chamber between said valve and said first named pressure line, and a pressure responsive member in said chamber connected to said valve to open the latter dependent solely upon the differential pressure in said chamber.

8. In a differential pressure operated braking system for a truck and trailer combination, a differential pressure power device for operating the truck brakes, a differential pressure power device for operating the trailer brakes, a manually operable control valve mechanism, a conduit connecting said mechanism to a source of differential pressure, a pipe connected at one end to said mechanism, said mechanism being operative for controlling communication between said pipe and said conduit, an auxiliary valve device connected to the other end of said pipe, pressure lines connecting said auxiliary valve device to the respective power devices, a valve in said valve device normally closing communication through the pressure line to the truck brake power device, and means for opening said valve dependent solely on the differential pressure in said pipe.

9. In a differential pressure operated braking system for a truck and trailer combination, a differential pressure power device for operating the truck brakes, a differential pressure power device for operating the trailer brakes, a manually operable control valve mechanism, a conduit connecting said mechanism to a source of differential pressure, a pipe connected at one end to said mechanism, said mechanism being operative for controlling communication between said pipe and said conduit, an auxiliary valve device connected to the other end of said pipe, pressure lines connecting said auxiliary valve device to the respective power devices, a valve in said valve device normally closing communication through the pressure line to the truck brake power device, and a pressure responsive member in said valve device connected to said valve and operable for opening the latter, said pressure responsive member being actuated dependent solely upon the differential pressure in said pipe.

10. In a differential pressure operated braking system for a truck and trailer combination, a differential pressure power device for operating the truck brakes, a differential pressure power device for operating the trailer brakes, a manually operable control valve mechanism, a conduit connecting said mechanism to a source of differential pressure, a pipe connected at one end to said mechanism, said mechanism being operative for controlling communication between said pipe and said conduit, an auxiliary valve device connected to the other end of said pipe, pressure lines connecting said auxiliary valve device to the respective power devices, a valve in said valve device normally closing communication through the pressure line to the truck brake power device, a chamber formed in said valve device and arranged in fixed communication with said pipe, and a pressure movable member in said chamber connected to said valve to open it, said pressure movable member being controlled solely by the differential pressure in said chamber.

11. In a differential pressure operated braking system for a truck and trailer combination, a differential pressure power device for operating the truck brakes, a differential pressure power device for operating the trailer brakes, a manually operable control valve mechanism, a conduit connecting said mechanism to a source of differential pressure, a pipe connected at one end to said mechanism, said mechanism being operative for controlling communication between said pipe and said conduit, an auxiliary valve device connected to the other end of said pipe, pressure lines connecting said auxiliary valve device to the respective power devices, a valve in said valve device normally closing communication through the pressure line to the truck brake power device, said valve device being provided with a passage affording constant communication between said pipe and the pressure line leading to the trailer brake power device, and a pressure responsive member connected to said valve and responsive solely to the differential pressure in said passage.

12. In a differential pressure operated braking system for a truck and trailer combination, a differential pressure power device for operating the truck brakes, a differential pressure power device for operating the trailer brakes, a manually operable control valve mechanism, a conduit connecting said mechanism to a source of differential pressure, a pipe connected at one end to said mechanism, said mechanism being operative for controlling communication between said pipe and said conduit, an auxiliary valve device connected to the other end of said pipe, pressure lines connecting said auxiliary valve device to the respective power devices, a valve in said valve device normally closing communication through the pressure line to the truck brake power device, said valve device being provided with a passage affording constant communication between said pipe and the pressure line leading to the trailer brake power device, a chamber formed in said valve device between said valve and said passage and in constant communication with the latter, and a pressure responsive member arranged in said chamber and connected to said valve to open the latter, said pressure responsive member being actuated solely by the differential pressure in said chamber.

EDWARD G. HILL.
JOHN X. PHILLIPS.